US010719923B2

(12) United States Patent
Fu et al.

(10) Patent No.: US 10,719,923 B2
(45) Date of Patent: Jul. 21, 2020

(54) METHOD AND APPARATUS FOR PROCESSING IMAGE (71) Applicant: Baidu Online Network Technology (Beijing) Co., Ltd., Beijing (CN)

(72) Inventors: Yi Fu, Beijing (CN); Xubin Li, Beijing (CN); Shilei Wen, Beijing (CN); Errui Ding, Beijing (CN); Xiao Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 92 days.

(21) Appl. No.: 16/134,693

(22) Filed: Sep. 18, 2018

(65) Prior Publication Data

US 2019/0188836 A1 Jun. 20, 2019

(30) Foreign Application Priority Data

Dec. 20, 2017 (CN) .......................... 2017 1 1386947

(51) Int. Cl.
*G06T 5/00* (2006.01)
*G06T 7/90* (2017.01)
*G06T 11/00* (2006.01)
*G06T 3/00* (2006.01)
(Continued)

(52) U.S. Cl.
CPC ............ *G06T 5/009* (2013.01); *G06T 3/0075* (2013.01); *G06T 5/002* (2013.01); *G06T 5/50* (2013.01); *G06T 7/90* (2017.01); *G06T 11/001* (2013.01); *G06T 11/60* (2013.01); *G06T 2207/10016* (2013.01); *G06T 2207/10024* (2013.01); *G06T 2207/20192* (2013.01); *G06T 2207/20221* (2013.01)

(58) Field of Classification Search
CPC ......... G06T 5/009; G06T 7/90; G06T 3/0075; G06T 5/002; G06T 5/50; G06T 11/001; G06T 11/60
USPC ........................................................ 382/167
See application file for complete search history.

(56) References Cited

U.S. PATENT DOCUMENTS 9,036,943 B1 * 5/2015 Baldwin ............ G06K 9/00664
382/284
2006/0187321 A1 * 8/2006 Sakamoto ............ H04N 1/3871
348/239
2018/0289240 A1 * 10/2018 Aoyama .................. A61B 1/07

FOREIGN PATENT DOCUMENTS

CA      2 690 987 A1    1/2009
CN      101690245 A     3/2010
CN      104574271 A     4/2015
(Continued)

*Primary Examiner* — Michael R Neff
(74) *Attorney, Agent, or Firm* — Seed IP Law Group LLP (57) ABSTRACT A method and apparatus for processing an image are provided. A specific embodiment of the method includes: acquiring a target image and a to-be-inserted image, and determining an insertion area in the target image; adjusting, based on an average lightness value of the insertion area and an average lightness value of the to-be-inserted image, a lightness value of a pixel included in the to-be-inserted image, an average lightness value being used to represent a lightness of an image; and adjusting, in response to determining that a difference between a color attribute value of the acquired to-be-inserted image and a color attribute value of the insertion area is outside a preset range, the color attribute value of the to-be-inserted image such that the difference is within the preset range. This embodiment improves the pertinence of adjusting image data.

11 Claims, 6 Drawing Sheets

(51) Int. Cl.
    *G06T 11/60*     (2006.01)
    *G06T 5/50*     (2006.01)

(56) References Cited

FOREIGN PATENT DOCUMENTS

| CN | 106530265 A | 3/2017 |
| CN | 106570838 A | 4/2017 |

\* cited by examiner

METHOD AND APPARATUS FOR PROCESSING IMAGE

CROSS-REFERENCE TO RELATED APPLICATIONS

This application claims priority to Chinese Patent Application No. 201711386947.0, filed on Dec. 20, 2017, titled "Method and Apparatus for Processing Image," which is hereby incorporated by reference in its entirety.

TECHNICAL FIELD

Embodiments of the present disclosure relate to the field of computer technology, specifically relate to the field of Internet technology, and more specifically relate to a method and an apparatus for processing an image.

BACKGROUND

Currently, with the image fusion technology, lightness and color of a to-be-inserted image may be consistent with those of a target scenario, making the fused image more natural. The main fusion methods available are the alpha matte method, and the fusion method based on the gradient domain. The method based on alpha matte may realize a fusion of foreground and background by parsing the α parameter (i.e., the ratio of the foreground color to the pixel color), so that the color consistency of a fused area is higher. The fusion method based on the gradient domain is an image editing method well-developed in recent years, well solving the problem that the lightness and the color of the to-be-inserted image have a big difference from those of the target scenario. With the fusion method based on the gradient domain, the color and the lightness gradually change from the fusion boundary to the inside of the image, thereby achieving a smooth transition of color.

SUMMARY

Embodiments of the present disclosure propose a method and apparatus for processing an image.

In a first aspect, the embodiments of the present disclosure provide a method for processing an image, including: acquiring a target image and a to-be-inserted image, and determining an insertion area in the target image; adjusting, based on an average lightness value of the insertion area and an average lightness value of the to-be-inserted image, a lightness value of a pixel included in the to-be-inserted image, the average lightness value being used to represent a lightness of an image; and adjusting, in response to determining that a difference between a color attribute value of the acquired to-be-inserted image and a color attribute value of the insertion area is outside a preset range, the color attribute value of the to-be-inserted image such that the difference is within the preset range, the color attribute value including at least one of: a primary tone value or a saturation value.

In some embodiments, the adjusting, based on an average lightness value of the insertion area and an average lightness value of the to-be-inserted image, a lightness value of a pixel included in the to-be-inserted image, includes: determining the average lightness value of the insertion area and the average lightness value of the to-be-inserted image; dividing the average lightness value of the insertion area by the average lightness value of the to-be-inserted image to obtain a lightness ratio; and adjusting, for each pixel included in the to-be-inserted image, the lightness value of the pixel to a product of the lightness value of the pixel and the lightness ratio.

In some embodiments, the adjusting, based on an average lightness value of the insertion area and an average lightness value of the to-be-inserted image, a lightness value of a pixel included in the to-be-inserted image, further includes: adjusting, in response to determining that an absolute value of a difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

In some embodiments, the adjusting the color attribute value of the to-be-inserted image such that the difference is within the preset range, includes: adjusting, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold. The first color attribute difference threshold includes at least one of: a first primary tone difference threshold or a first saturation difference threshold, and the second color attribute difference threshold includes at least one of: a second primary tone difference threshold or a second saturation difference threshold.

In some embodiments, after the adjusting, in response to determining that a difference between a color attribute value of the acquired to-be-inserted image and a color attribute value of the insertion area is outside a preset range, the color attribute value of the to-be-inserted image such that the difference is within the preset range, the method further includes: performing an affine transformation on the insertion area to obtain a transformed area that is consistent with a boundary of the to-be-inserted image, and inserting the to-be-inserted image into the transformed area, in response to determining that the insertion area is inconsistent with the boundary of the to-be-inserted image; and inserting the to-be-inserted image into the insertion area, in response to determining that the insertion area is consistent with the boundary of the to-be-inserted image.

In some embodiments, the method further includes: eliminating an edge serration of the image inserted into the target image using a Gaussian blur algorithm.

In a second aspect, the embodiments of the present disclosure provide an apparatus for processing an image, including: an acquisition unit, configured to acquire a target image and a to-be-inserted image, and determine an insertion area in the target image; a first adjusting unit, configured to adjust, based on an average lightness value of the insertion area and an average lightness value of the to-be-inserted image, a lightness value of a pixel included in the to-be-inserted image, the average lightness value being used to represent a lightness of an image; and a second adjusting unit, configured to adjust, in response to determining that a difference between a color attribute value of the acquired to-be-inserted image and a color attribute value of the insertion area is outside a preset range, the color attribute value of the to-be-inserted image such that the difference is within the preset range, the color attribute value including at least one: a primary tone value or a saturation value.

In some embodiments, the first adjusting unit includes: a determination module, configured to determine the average lightness value of the insertion area and the average lightness value of the to-be-inserted image; a calculation module, configured to divide the average lightness value of the insertion area by the average lightness value of the to-be-inserted image to obtain a lightness ratio; and a first adjusting module, configured to adjust, for each pixel included in the to-be-inserted image, the lightness value of the pixel to a product of the lightness value of the pixel and the lightness ratio.

In some embodiments, the first adjusting unit further includes: a second adjusting module, configured to adjust, in response to determining that an absolute value of a difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

In some embodiments, the second adjusting unit is further configured to: adjust, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold. The first color attribute difference threshold includes at least one of: a first primary tone difference threshold or a first saturation difference threshold, and the second color attribute difference threshold includes at least one of: a second primary tone difference threshold or a second saturation difference threshold.

In some embodiments, the apparatus further includes: an inserting unit, configured to perform an affine transformation on the insertion area to obtain a transformed area that is consistent with a boundary of the to-be-inserted image, and insert the to-be-inserted image into the transformed area, in response to determining that the insertion area is inconsistent with the boundary of the to-be-inserted image; and insert the to-be-inserted image into the insertion area, in response to determining that the insertion area is consistent with the boundary of the to-be-inserted image.

In some embodiments, the apparatus further includes: an elimination unit, configured to eliminate an edge serration of the image inserted into the target image using a Gaussian blur algorithm.

In a third aspect, the embodiments of the present disclosure provide an electronic device, including: one or more processors; and a storage apparatus, for storing one or more programs, the one or more programs, when executed by the one or more processors, cause the one or more processors to implement the method according to any one of the embodiments of the first aspect.

In a fourth aspect, the embodiments of the present disclosure provide a computer readable storage medium, storing a computer program, the program, when executed by a processor, implements the method according to any one of the embodiments of the first aspect.

The method and apparatus for processing an image according to the embodiments of the present disclosure adjusts the lightness value of the pixel included in the to-be-inserted image based on the average lightness value of the insertion area in the target image and the average lightness value of the to-be-inserted image, and then adjusts the color attribute value of the to-be-inserted image such that the difference between the color attribute values of the to-be-inserted image and the insertion area is within the preset range, thereby improving the pertinence of adjusting image data.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
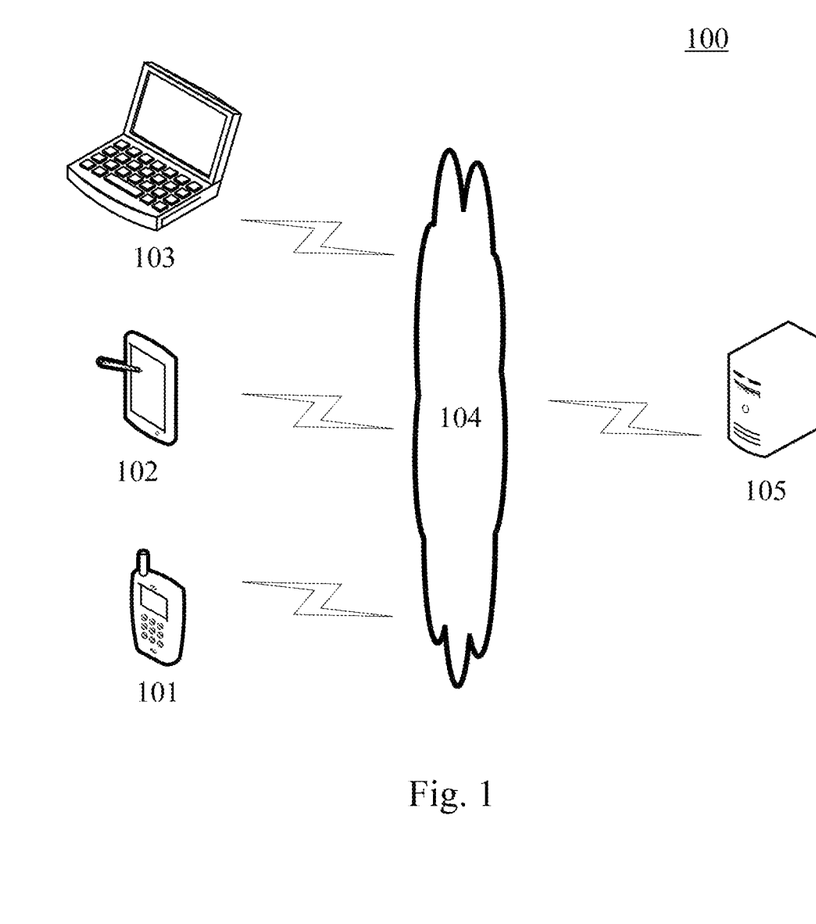
FIG. 1 is an exemplary system architecture diagram to which the present disclosure may be applied.

FIG. 1 shows an exemplary system architecture 100 in which a method for processing an image or an apparatus for processing an image according to the embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as image processing applications, webpage browser applications, shopping applications, search applications, instant messaging tools, mailbox clients, and social platform software may be installed on the terminal devices 101, 102 and 103.

The terminal devices 101, 102 and 103 may have display screens and support webpage browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend image supporting image displayed on the terminal devices 101, 102 or 103, The backend image processing server may process and analyze received data, and return a processing result (for example, image data) to the terminal devices.

It should be noted that the method for processing an image according to the embodiments of the present disclosure is generally executed by the server 105. Accordingly, the apparatus for processing an image is generally installed on the server 105.

It should be appreciated that the numbers of the terminal devices, the networks and the servers in FIG. 1 are merely illustrative. Any number of terminal devices, networks and servers may be provided based on the actual requirements. In the case where the image to be processed does not need to be acquired remotely, the system architecture may not include the network, but only the terminal device or the server is required.

Figure 2:
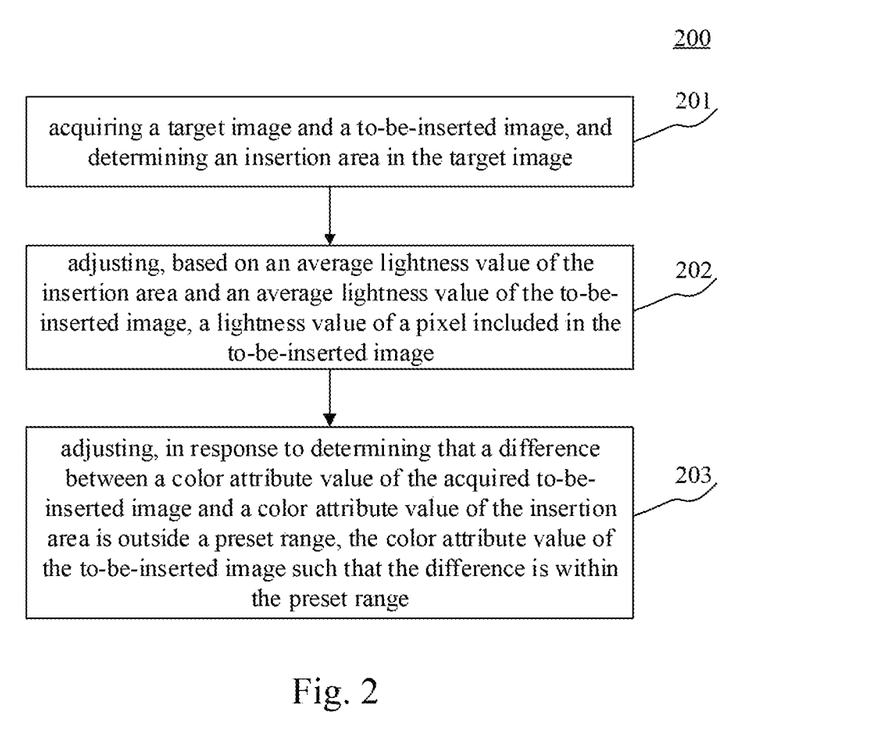
FIG. 2 is a flowchart of an embodiment of a method for processing an image according to the present disclosure.

With further reference to FIG. 2, a flow 200 of a method for processing an image according to an embodiment of the present disclosure is illustrated. The method for processing an image includes steps 201 to 203.

Step 201 includes acquiring a target image and a to-be-inserted image, and determining an insertion area in the target image.

In the present embodiment, the electronic device (e.g., the server or terminal device as shown in FIG. 1) on which the method for processing an image is implemented may acquire the target image and the to-be-inserted image remotely (e.g., from other server or terminal device) or locally (e.g., from a server or the terminal device itself) through a wired connection or a wireless connection, and determine the insertion area in the target image. Here, the to-be-inserted image may be an image pre-acquired and pre-stored in the electronic device, and the target image may be an image in a preset image sequence or a preset image set. The target image may be one image or at least two images. For example, the electronic device may determine a plurality of image frames included in a certain video as the target image. The electronic device may determine a specific area from the target image as the insertion area. For example, the electronic device may acquire a polygonal area set by an operator in the target image, and determine the polygonal area as the insertion area.

Step 202 includes adjusting, based on an average lightness value of the insertion area and an average lightness value of the to-be-inserted image, a lightness value of a pixel included in the to-be-inserted image.

In the present embodiment, based on the to-be-inserted image acquired in step 201 and the determined insertion area, the electronic device may first determine the average lightness value of the insertion area and the average lightness value of the to-be-inserted image, and then adjust the lightness value of the pixel included in the to-be-inserted image based on the average lightness value of the insertion area and the average lightness value of the to-be-inserted image. Here, the average lightness value is used to represent a lightness of an image. The electronic device may adjust the lightness value of the pixel included in the to-be-inserted image by various approaches. For example, the electronic device may first determine an absolute value of the difference between the average lightness value of the to-be-inserted image and the average lightness value of the insertion area, then add or subtract the lightness value of the pixel included in the to-be-inserted image to or by the calculated difference, so that the adjusted average lightness value of the to-be-inserted image is the same as the average lightness value of the insertion area.

In some alternative implementations of the present embodiment, the electronic device may adjust the lightness value of the pixel included in the to-be-inserted image by the following steps: first, the electronic device may determine the average lightness value of the insertion area and the average lightness value of the to-be-inserted image; then, the electronic device may divide the average lightness value of the insertion area by the average lightness value of the to-be-inserted image to obtain a lightness ratio; and finally, the electronic device may adjust, for each pixel included in the to-be-inserted image, the lightness value of the pixel to a product of the lightness value of the pixel and the lightness ratio.

The to-be-inserted image and the insertion area may be transformed into a color space having lightness then the average lightness value is extracted from the color space. The color space based on lightness may include, but is not limited to, at least one of: HSV (Hue Saturation Value), HSL (Hue Saturation Lightness).

It should be noted that when the number of target images is greater than one, the average lightness value may alternatively be a value obtained by averaging a sum of the average lightness values of the at least two images.

In some alternative implementations of the present embodiment, the electronic device may adjust, in response to determining that an absolute value of the difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

For example, assuming that the first lightness difference threshold is x1, the second lightness difference threshold is x2, the average lightness value of the to-be-inserted image with the adjusted lightness is x3, and the average lightness value of the insertion area is x4, when $x3>x4$ and $(x3-x4)>x1$, x3 is decreased, so that $x2 \leq |x3-x4| \leq x1$; when $x3>x4$ and $(x3-x4)<x2$, x3 is increased, so that $x2 \leq |x3-x4| \leq x1$; when $x3<x4$ and $(x4-x3)>x1$, x3 is increased, so that $x2 \leq |x3-x4| \leq x1$; when $x3<x4$ and $(x4-x3)<x2$, x3 is decreased, so that x2≤|x3−x4|≤x1. Here, the result of |x3−x4| may be any numerical value satisfying x2≤|x3−x4|≤x1.

In some alternative implementations of the present embodiment, the electronic device may adjust the average lightness value of the to-be-inserted image in a progressive increment or successive decrement mode so that the absolute value of the difference between the average lightness value of the to-be-inserted image and the average lightness value of the insertion area is between the first lightness difference threshold and the second lightness difference threshold. Exemplarily, the first lightness difference threshold is x1, the second lightness difference threshold is x2, the average lightness value of the to-be-inserted image with the adjusted lightness is x3, and the average lightness value of the insertion area is x4, when x3>x4 and (x3−x4)>x1, if the set successive decrement value is x5, the electronic device may subtract x5 from x3, and then determine whether x3−x4 is greater than x1 at this time, and if yes, continue to subtract x5 from x3 until x3 satisfies x2≤|x3−x4|≤x1.

Step 203 includes adjusting, in response to determining that a difference between a color attribute value of the acquired to-be-inserted image and a color attribute value of the insertion area is outside a preset range, the color attribute value of the to-be-inserted image such that the different is within the preset range.

In the present embodiment, the electronic device may acquire the color attribute value of the to-be-inserted image and the color attribute value of the insertion area to further determine whether the difference between the acquired color attribute value of the to-be-inserted image and the color attribute value of the insertion area is within the preset range, and in response to the difference being outside the preset range, the electronic device may adjust the color attribute value of the to-be-inserted image such that the difference is within the preset range. Here, the color attribute value may include at least one of: a primary tone value or a saturation value.

In some alternative implementations of the present embodiment, the electronic device may in response to determining that an absolute value of the difference between the color attribute value of the to-be-inserted image and the color attribute value of the insertion area is greater than a preset first color attribute difference threshold or smaller than a preset second color attribute difference threshold, adjust the color attribute value of the to-be-inserted image, such that the absolute value of the difference between the color attribute value of the to-be-inserted image and the color attribute value of the insertion area is between the first color attribute difference threshold and the second color attribute difference threshold. Here, the color attribute difference threshold includes at least one of: a primary tone difference threshold or a saturation difference threshold. The absolute value of the difference between the adjusted color attribute value of the to-be-inserted image and the color attribute value of the insertion area may be any numerical value between the first color attribute difference threshold and the second color attribute difference threshold.

In some alternative implementations of the present embodiment, the electronic device may adjust the color attribute value of the to-be-inserted image in a progressive increment mode or a successive decrement way so that the absolute value of the difference between the color attribute value of the to-be-inserted image and the color attribute value of the insertion area is between the first color attribute difference threshold and the second color attribute difference threshold. Exemplarily, assuming that the first primary tone difference threshold is y1, the second primary tone difference threshold is y2, the primary tone value of the to-be-inserted image is y3, and the primary tone value of the insertion area is y4, when y3>y4 and (y3−y4)>y1, if the set successive decrement value is y5, the electronic device may subtract y5 from y3, and then determine whether y3−y4 is greater than y1 at this time, and if yes, continue to subtract y5 from y3 until y3 satisfies y2≤|y3−y4|≤y1.

It should be noted that the method for determining a primary tone value and a saturation value of an image is a well-known technology widely studied and applied at present, and detailed description thereof will be omitted.

Figure 3:
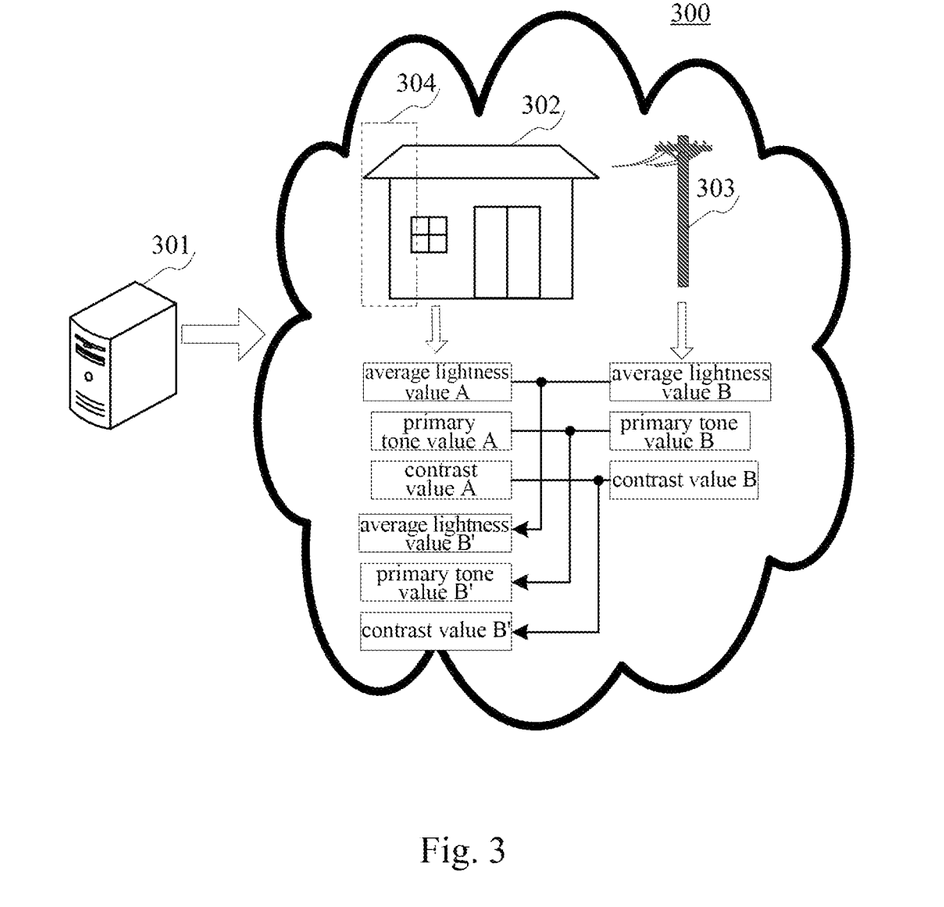
FIG. 3 is a schematic diagram of an application scenario of the method for processing an image according to the present disclosure.

With further reference to FIG. 3, FIG. 3 is a schematic diagram of an application scenario of the method for processing an image according to the present embodiment. In the application scenario of FIG. 3, the user sets a to-be-inserted image 303 in the computer 301, and uses an image frame in a video as the target image 302. In the target image 302, a polygon area is determined as the insertion area 304. Then, the computer 301 acquires the average lightness value A of the insertion area 304 and the average lightness value B of the to-be-inserted image 303. The computer 301 adjusts the average lightness value B of the to-be-inserted image 303 to obtain a new average lightness value B'. Finally, the computer 301 acquires the primary tone value A and the contrast value A of the insertion area 304, and the primary tone value B and the contrast value B of the to-be-inserted image 303, and adjusts the primary tone value B and the contrast value B of the to-be-inserted image 303 to a preset range to obtain a new primary tone value B' and a contrast value B'. By performing the above steps, the computer 301 may make the lightness, color, and the like of the to-be-inserted image 303 closer but not identical to those of the insertion area 304, so that the to-be-inserted image 303 and the insertion area 304 are distinguishable.

The method according to the embodiments of the present disclosure adjusts the lightness value of the pixel included in the to-be-inserted image based on the average lightness value of the insertion area in the target image and the average lightness value of the to-be-inserted image, and then adjusts the color attribute value of the to-be-inserted image to the preset range, thereby improving the flexibility of image processing when fusing the image.

Figure 4:
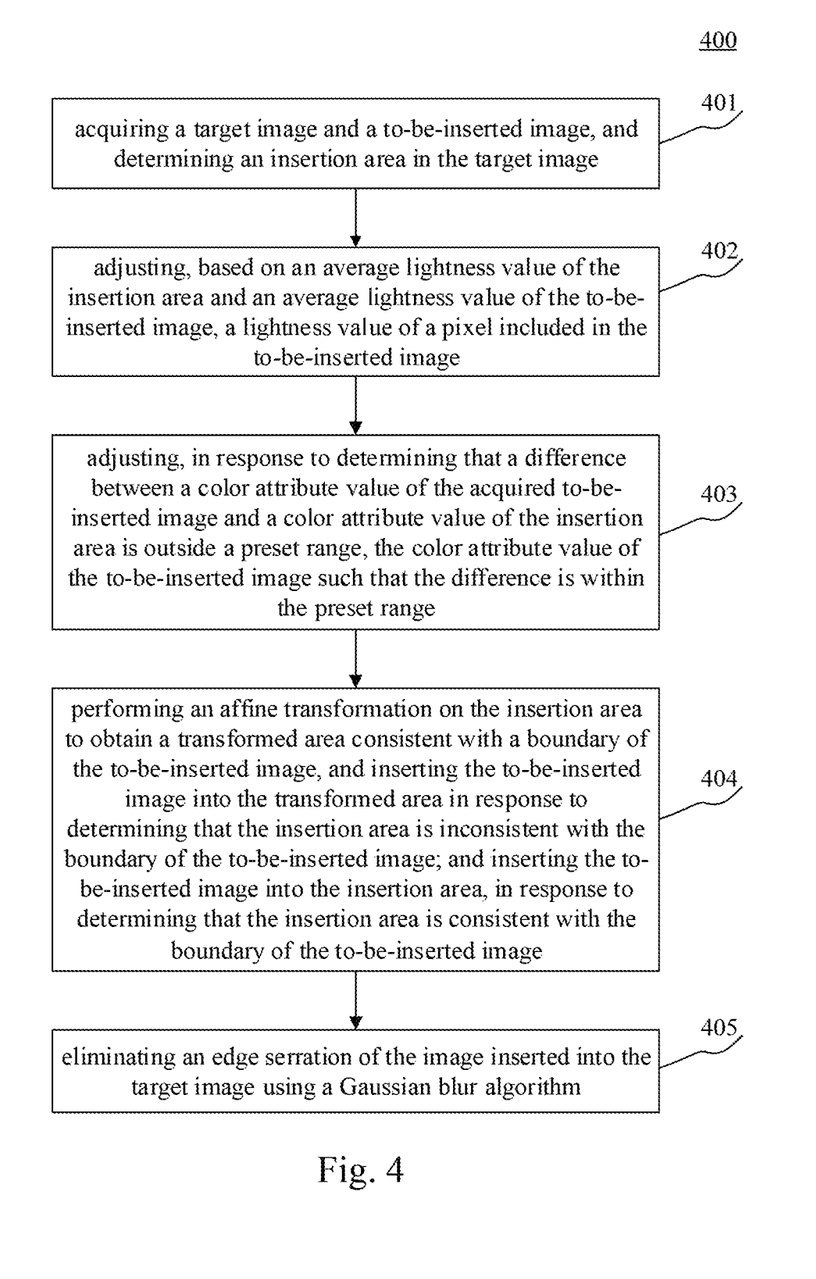
FIG. 4 is a flowchart of another embodiment of the method for processing an image according to the present disclosure.

With further reference to FIG. 4, a flow 400 of another embodiment of the method for processing an image is illustrated. The flow 400 of the method for processing an image includes steps 401 to 405.

Step 401 includes acquiring a target image and a to-be-inserted image, and determining an insertion area in the target image.

In the present embodiment, step 401 is substantially the same as step 201 in the corresponding embodiment of FIG. 2, and detailed description thereof will be omitted.

Step 402 includes adjusting, based on an average lightness value of the insertion area and an average lightness value of the to-be-inserted image, a lightness value of a pixel included in the to-be-inserted image.

In the present embodiment, step 402 is substantially the same as step 202 in the corresponding embodiment of FIG. 2, and detailed description thereof will be omitted.

Step 403 includes adjusting, in response to determining that a difference between a color attribute value of the acquired to-be-inserted image and a color attribute value of the insertion area is outside a preset range, the color attribute value of the to-be-inserted image such that the difference is within the preset range.

In the present embodiment, step 403 is substantially the same as step 203 in the corresponding embodiment of FIG. 2, and detailed description thereof will be omitted.

Step 404 includes performing an affine transformation on the insertion area to obtain a transformed area consistent with a boundary of the to-be-inserted image, and inserting the to-be-inserted image into the transformed area, in response to determining that the insertion area is inconsistent with the boundary of the to-be-inserted image; and inserting the to-be-inserted image into the insertion area, in response to determining that the insertion area is consistent with the boundary of the to-be-inserted image.

In the present embodiment, based on the adjusted to-be-inserted image obtained in steps 402 and 403, the electronic device may perform the affine transformation on the insertion area to obtain the transformed area consistent with the boundary of the to-be-inserted image, and insert the to-be-inserted image into the transformed area in response to determining that the insertion area is inconsistent with the boundary of the to-be-inserted image.

Here, the affine transformation is also referred to as affine mapping, which means that in the geometry, one vector space performs a linear transformation and a translation, and transforms into another vector space. Through the affine transformation, the insertion area may have a shape matching the shape of the to-be-inserted image. For example, the shape of the transformed insertion area and the shape of the to-be-inserted image are quadrilaterals having the same shape and size. It should be noted that the above affine transformation is a well-known technology widely studied and applied at present, and detailed description thereof will be omitted.

In the present embodiment, the electronic device may also insert the to-be-inserted image into the insertion area, in response to determining that the insertion area is consistent with the boundary of the to-be-inserted image.

Step 405 includes eliminating an edge serration of the image inserted into the target image using a Gaussian blur algorithm.

In the present embodiment, after the to-be-inserted image is inserted into the target image, the electronic device may eliminate the edge serration of the image inserted into the target image using the Gaussian blur algorithm. It should be noted that the above Gaussian blur algorithm is a well-known technology widely studied and applied at present, and detailed description thereof will be omitted.

As can be seen from FIG. 4, the flow 400 of the method for processing an image in the present embodiment highlights the steps of the affine transformation of the insertion area and the insertion of the to-be-inserted image into the target image, as compared with the corresponding embodiment of FIG. 2. Therefore, with the solution described in the present embodiment, the to-be-inserted image may be similar to the insertion area in color when fusing the image, and the to-be-inserted image may be distinguishable from the insertion area, thereby further improving the pertinence of adjusting image data.

Figure 5:
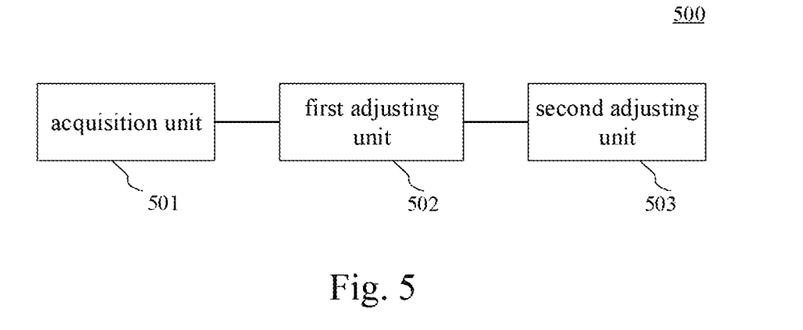
FIG. 5 is a schematic structural diagram of an embodiment of an apparatus for processing an image according to the present disclosure.

With further reference to FIG. 5, as an implementation to the method shown in the above figures, the present disclosure provides an embodiment of an apparatus for processing an image. The apparatus embodiment corresponds to the method embodiment shown in FIG. 2, and the apparatus may specifically be applied to various electronic devices.

As shown in FIG. 5, the apparatus 500 for processing an image of the present embodiment includes: an acquisition unit 501, configured to acquire a target image and a to-be-inserted image, and determine an insertion area in the target image; a first adjusting unit 502, configured to adjust, based on an average lightness value of the insertion area and an average lightness value of the to-be-inserted image, a lightness value of a pixel included in the to-be-inserted image, an average lightness value being used to represent a lightness of an image; and a second adjusting unit 503, configured to adjust, in response to determining that a difference between a color attribute value of the acquired to-be-inserted image and a color attribute value of the insertion area is outside a preset range, the color attribute value of the to-be-inserted image such that the difference is within the preset range, the color attribute value including at least one of: a primary tone value or a saturation value.

In the present embodiment, the acquisition unit 501 of the apparatus 500 for processing an image may acquire the target image and the to-be-inserted image from remotely (e.g., from other server or terminal device) or locally (e.g., from a server or the terminal device itself), and determine a insertion area in the target image through a wired connection or a wireless connection.

In the present embodiment, based on the to-be-inserted image acquired by the acquisition unit 501 and the determined insertion area, the first adjusting unit 502 may first determine the average lightness value of the insertion area and the average lightness value of the to-be-inserted image, and then adjust the lightness value of the pixel included in the to-be-inserted image based on the average lightness value of the insertion area and the average lightness value of the to-be-inserted image. Here, the average lightness value may be an average of the lightness values of at least two pixels in the image.

In the present embodiment, the second adjusting unit 503 may acquire the color attribute value of the to-be-inserted image and the color attribute value of the insertion area to further determine whether the difference between the acquired color attribute value of the to-be-inserted image and the color attribute value of the insertion area is within a preset range, and in response to the difference being outside the preset range, the second adjusting unit 503 may adjust the color attribute value of the to-be-inserted image such that the difference is within the preset range. Here, the color attribute value may include at least one of: a primary tone value or a saturation value.

In some alternative implementations of the present embodiment, the first adjusting unit 502 may include: a determination module (not shown in the figure), configured to determine the average lightness value of the insertion area and the average lightness value of the to-be-inserted image; a calculation module (not shown in the figure), configured to divide the average lightness value of the insertion area by the average lightness value of the to-be-inserted image to obtain a lightness ratio; and a first adjusting module (not shown in the figure), configured to adjust, for each pixel included in the to-be-inserted image, the lightness value of the pixel to a product of the lightness value of the pixel and the lightness ratio.

In some alternative implementations of the present embodiment, the first adjusting unit 502 may further include: a second adjusting module (not shown in the figure), configured to adjust, in response to determining that an absolute value of a difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

In some alternative implementations of the present embodiment, the second adjusting unit 503 may be further configured to: adjust, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold. Here, a color attribute difference threshold includes at least one of: a primary tone difference threshold or a saturation difference threshold.

In some alternative implementations of the present embodiment, the apparatus 500 for processing an image may further include: an inserting unit (not shown in the figure), configured to perform an affine transformation on the insertion area to obtain a transformed area that is consistent with a boundary of the to-be-inserted image, in response to determining that the insertion area is inconsistent with the boundary of the to-be-inserted image; insert the to-be-inserted image into the transformed area; and insert the to-be-inserted image into the insertion area, in response to determining that the insertion area is consistent with the boundary of the to-be-inserted image.

In some alternative implementations of the present embodiment, the apparatus 500 for processing an image may further include: an elimination unit (not shown in the figure), configured to eliminate an edge serration of the image inserted into the target image using a Gaussian blur algorithm.

The apparatus according to the embodiments of the present disclosure acquires the target image and a to-be-inserted image by the acquisition unit 501, then adjusts the lightness value of the pixel included in the to-be-inserted image based on the average lightness value of the insertion area in the target image and the average lightness value of the to-be-inserted image by the first adjusting unit 502, and finally adjusts the color attribute value of the to-be-inserted image such the different between the color attribute value of the to-be-inserted image and the insertion area is within the preset range by the second adjusting unit 503, thereby improving the pertinence of adjusting image data.

Figure 6:
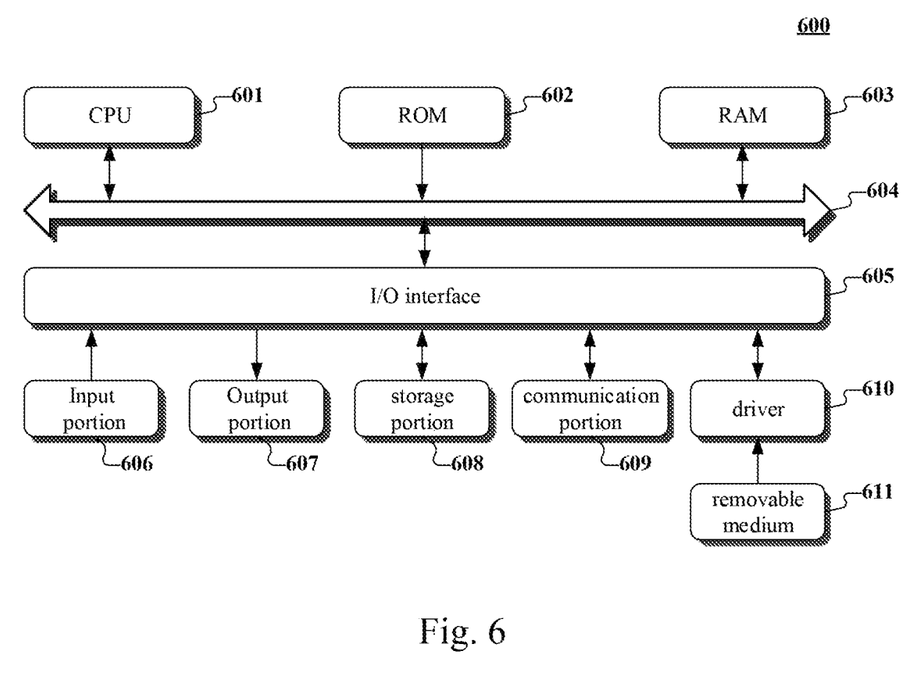
FIG. 6 is a schematic structural diagram of a computer system adapted to implement an electronic device of the embodiments of the present disclosure.

Referring to FIG. 6, a schematic structural diagram of a computer system 600 adapted to implement an electronic device of the embodiments of the present disclosure is shown. The electronic device shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, a first adjusting unit, and a second adjusting unit, where the names of these units do not in some cases constitute a limitation to such units themselves. For example, the acquisition unit may also be described as "a unit for a target image and a to-be-inserted image, and determining a insertion area in the target image."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: acquiring a target image and a to-be-inserted image, and determining an insertion area in the target image; adjusting, based on an average lightness value of the insertion area and an average lightness value of the to-be-inserted image, a lightness value of a pixel included in the to-be-inserted image, an average lightness value being used to represent a lightness of an image; and adjusting, in response to determining that a difference between a color attribute value of the acquired to-be-inserted image and a color attribute value of the insertion area is outside a preset range, the color attribute value of the to-be-inserted image such that the difference is within the preset range, the color attribute value including at least one of: a primary tone value or a saturation value.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, the method comprising:
    acquiring a target image and a to-be-inserted image, and determining an insertion area in the target image;
    adjusting, based on an average lightness value of the insertion area and an average lightness value of the to-be-inserted image, a lightness value of a pixel included in the to-be-inserted image, the average lightness value being used to represent a lightness; and
    adjusting, in response to determining that a difference between a color attribute value of the acquired to-be-inserted image and a color attribute value of the insertion area is outside a preset range, the color attribute value of the to-be-inserted image such that the difference is within the preset range, the color attribute value comprising at least one of: a primary tone value or a saturation value, wherein the adjusting the color attribute value of the to-be-inserted image such that the difference is within the preset range, comprises:
        adjusting, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold, wherein the color attribute difference threshold comprises at least one of: a primary tone difference threshold or a saturation difference threshold.

2. The method according to claim 1, wherein the adjusting, based on an average lightness value of the insertion area and an average lightness value of the to-be-inserted image, a lightness value of a pixel included in the to-be-inserted image, comprises:
    determining the average lightness value of the insertion area and the average lightness value of the to-be-inserted image;
    dividing the average lightness value of the insertion area by the average lightness value of the to-be-inserted image to obtain a lightness ratio; and
    adjusting, for each pixel included in the to-be-inserted image, the lightness value of the pixel to a product of the lightness value of the pixel and the lightness ratio.

3. The method according to claim 2, wherein the adjusting, based on an average lightness value of the insertion area and an average lightness value of the to-be-inserted image, a lightness value of a pixel included in the to-be-inserted image, further comprises:

adjusting, in response to determining that an absolute value of a difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

4. The method according to claim 1, wherein, after the adjusting, in response to determining that a difference between a color attribute value of the acquired to-be-inserted image and a color attribute value of the insertion area is outside a preset range, the color attribute value of the to-be-inserted image such that the difference is within the preset range, the method further comprises:

performing an affine transformation on the insertion area to obtain a transformed area that is consistent with a boundary of the to-be-inserted image, and inserting the to-be-inserted image into the transformed area, in response to determining that the insertion area is inconsistent with the boundary of the to-be-inserted image; and inserting the to-be-inserted image into the insertion area, in response to determining that the insertion area is consistent with the boundary of the to-be-inserted image.

5. The method according to claim 4, wherein the method further comprises:

eliminating an edge serration of the image inserted into the target image using a Gaussian blur algorithm.

6. An apparatus for processing an image, the apparatus comprising:

at least one processor; and a memory storing instructions, wherein the instructions when executed by the at least one processor, cause the at least one processor to perform operations, the operations comprising:

acquiring a target image and a to-be-inserted image, and determine an insertion area in the target image;

adjusting, based on an average lightness value of the insertion area and an average lightness value of the to-be-inserted image, a lightness value of a pixel included in the to-be-inserted image, the average lightness value being used to represent a lightness; and adjusting, in response to determining that a difference between a color attribute value of the acquired to-be-inserted image and a color attribute value of the insertion area is outside a preset range, the color attribute value of the to-be-inserted image such that the difference is within the preset range, the color attribute value comprising at least one of: a primary tone value or a saturation value, wherein the adjusting the color attribute value of the to-be-inserted image such that the difference is within the preset range, comprises:

adjusting, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold, wherein the color attribute difference threshold comprises at least one of: a primary tone difference threshold or a saturation difference threshold.

7. The apparatus according to claim 6, wherein the adjusting, based on an average lightness value of the insertion area and an average lightness value of the to-be-inserted image, a lightness value of a pixel included in the to-be-inserted image, comprises:

determining the average lightness value of the insertion area and the average lightness value of the to-be-inserted image;

dividing the average lightness value of the insertion area by the average lightness value of the to-be-inserted image to obtain a lightness ratio; and adjusting, for each pixel included in the to-be-inserted image, the lightness value of the pixel to a product of the lightness value of the pixel and the lightness ratio.

8. The apparatus according to claim 7, wherein the adjusting, based on an average lightness value of the insertion area and an average lightness value of the to-be-inserted image, a lightness value of a pixel included in the to-be-inserted image, further comprises:

adjusting, in response to determining that an absolute value of a difference between the average lightness value of the to-be-inserted image having the pixel with the adjusted lightness value and the average lightness value of the insertion area is greater than a preset first lightness difference threshold or less than a preset second lightness difference threshold, the average lightness value of the to-be-inserted image, such that the absolute value of the difference between the average lightness value of the to-be-inserted image and the average lightness value of the insertion area is between the first lightness difference threshold and the second lightness difference threshold.

9. The apparatus according to claim 6, wherein after the adjusting, in response to determining that a difference between a color attribute value of the acquired to-be-inserted image and a color attribute value of the insertion area is outside a preset range, the color attribute value of the to-be-inserted image such that the difference is within the preset range, the operations further comprise:

performing an affine transformation on the insertion area to obtain a transformed area that is consistent with a boundary of the to-be-inserted image, and insert the to-be-inserted image into the transformed area, in response to determining that the insertion area is inconsistent with the boundary of the to-be-inserted image; and inserting the to-be-inserted image into the insertion area, in response to determining that the insertion area is consistent with the boundary of the to-be-inserted image.

10. The apparatus according to claim 9, wherein the operations further comprise:

eliminating an edge serration of the image inserted into the target image using a Gaussian blur algorithm.

11. A non-transitory computer storage medium, storing a computer program, wherein the computer program, when executed by a processor, causes the processor to perform operations, the operations comprising:

acquiring a target image and a to-be-inserted image, and determining an insertion area in the target image;

adjusting, based on an average lightness value of the insertion area and an average lightness value of the to-be-inserted image, a lightness value of a pixel included in the to-be-inserted image, the average lightness value being used to represent a lightness; and adjusting, in response to determining that a difference between a color attribute value of the acquired to-be-inserted image and a color attribute value of the insertion area is outside a preset range, the color attribute value of the to-be-inserted image such that the difference is within the preset range, the color attribute value comprising at least one of: a primary tone value or a saturation value, wherein the adjusting the color attribute value of the to-be-inserted image such that the difference is within the preset range, comprises:

adjusting, in response to determining that an absolute value of the difference between the color attribute value of the to-be-inserted image and the color attribute value of the insertion area is greater than a preset first color attribute difference threshold or less than a preset second color attribute difference threshold, the color attribute value of the to-be-inserted image, such that the absolute value of the difference between the color attribute value of the to-be-inserted image and the color attribute value of the insertion area is between the first color attribute difference threshold and the second color attribute difference threshold, wherein the color attribute difference threshold comprises at least one of: a primary tone difference threshold or a saturation difference threshold.

* * * * *